(12) United States Patent
Macaskill

(10) Patent No.: US 9,373,101 B2
(45) Date of Patent: Jun. 21, 2016

(54) FILTERING SOCIAL NETWORKING CONTENT

(75) Inventor: Don Macaskill, Los Altos, CA (US)

(73) Assignee: SMUGMUG, INC., Mountain View, CA (US)

( * ) Notice: Subject to any disclaimer, the term of this patent is extended or adjusted under 35 U.S.C. 154(b) by 680 days.

(21) Appl. No.: 13/593,259

(22) Filed: Aug. 23, 2012

(65) Prior Publication Data

US 2013/0054699 A1 Feb. 28, 2013

Related U.S. Application Data

(60) Provisional application No. 61/528,112, filed on Aug. 26, 2011.

(51) Int. Cl.
*G06F 15/16* (2006.01)
*G06Q 10/10* (2012.01)
*G06Q 50/00* (2012.01)

(52) U.S. Cl.
CPC .............. *G06Q 10/101* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 8,438,165 B2 * | 5/2013 | Ickman | ............. | G06F 17/30867 707/713 |
| 8,606,792 B1 * | 12/2013 | Jackson | ............. | G06F 17/30699 707/748 |
| 8,660,864 B2 * | 2/2014 | Krause | ............. | G06Q 40/08 705/4 |
| 8,825,759 B1 * | 9/2014 | Jackson | ............. | H04L 67/02 705/14.69 |
| 2007/0055610 A1 * | 3/2007 | Palestrant | ............. | G06Q 10/06 705/37 |
| 2009/0249451 A1 * | 10/2009 | Su | ............. | G06F 17/30867 726/5 |
| 2010/0030648 A1 * | 2/2010 | Manolescu | ........ | G06Q 10/0637 705/14.66 |
| 2010/0131455 A1 | 5/2010 | Logan et al. | | |
| 2011/0055017 A1 * | 3/2011 | Solomon | ............. | G06Q 30/0269 705/14.66 |
| 2011/0179020 A1 * | 7/2011 | Ozzie | ............. | G06F 17/3089 707/723 |
| 2011/0238754 A1 * | 9/2011 | Dasilva | ............. | G06F 17/3082 709/204 |
| 2012/0185486 A1 * | 7/2012 | Voigt | ............. | H04L 51/32 707/741 |

OTHER PUBLICATIONS

International Search Report and Written Opinion dated Feb. 5, 2013 for International Application PCT/US2012/052445, 8 pages.

* cited by examiner

*Primary Examiner* — Viet Vu
*Assistant Examiner* — James Edwards
(74) *Attorney, Agent, or Firm* — Patterson & Sheridan, LLP

(57) ABSTRACT

A method for filtering social media content based on interest categories. Users of a social network can be associated with one or more interest categories. Posts or updates made in the social network by friends of a first user are associated with one or more interest categories. A social feed can be filtered based on the interested categories or the first user of the social feed and/or the interests associated with the posts or updates made by the first user's friends. In some cases, the filtered social media content is ordered based on expertise of the first user's friends in the particular interest categories of those users' posts.

10 Claims, 16 Drawing Sheets

Interface 300

John Doe
San Jose, CA
Interests: Photography, Cooking, Programming, {...}

Subscribe to all of John's interests 302

Subscribe to intersecting interests 304

Subscribe to specific interests 306

315

Subscription Interface 312

Please select one or more of John's interests to which you'd like to subscribe:

☒ Aviation
☒ Cooking
☒ Photography
☐ Programming
☒ Rock Climbing
☐ Skiing
☒ Snowboarding Subscribe Now

Figure 3D

FILTERING SOCIAL NETWORKING CONTENT

CROSS-REFERENCE TO RELATED APPLICATIONS

This application claims benefit of U.S. provisional patent application Ser. No. 61/528,112, filed Aug. 26, 2011, which is herein incorporated by reference.

BACKGROUND

1. Field of the Invention

The present invention relates to the field of computer software and, in particular, to a system and method for filtering social networking content.

2. Description of the Related Art

The popularity of social networks has substantially increased in recent years. As a result, the amount of content that is generated by users and submitted to social networks has also increased. The content is then "consumed" by users of the social network. One popular method of consuming social networking content involves the implementation of content "feeds." A content feed is used to deliver a stream of content to subscribers of the feed. In one example, a user may subscribe to a feed associated with his or her friend. In another example, a feed may correspond to a certain category of friends and deliver all content generated by those friends, for example, co-workers vs. relatives. However, content that the user is not interested in is oftentimes included in the feed, which can obscure the interesting information. For example, a co-worker of a user may, in addition to generating work-related content, generate a large amount of content that is work-unrelated, such as content pertaining to extracurricular activities in which the co-worker of the user is interested. As a result, the user is spammed with such content in the feed, which decreases the overall utility of the co-worker's feed.

As the foregoing illustrates, there is a need in the art for an improved technique for filtering social networking content.

SUMMARY

One embodiment of the invention provides a method for filtering posts in a feed of a social network based on interest categories associated with the posts. The method includes the steps of receiving from a first user a request to view the feed, wherein the feed is associated with a second user, determining one or more interest categories associated with the second user to which the first user is subscribed, identifying at least one post that corresponds to at least one of the one or more interest categories, and sending the one or more posts to the first user.

Another embodiment of the invention provides a method for ordering posts in a feed of a social network. The method includes the steps of receiving a request from a first user to view the feed, wherein the feed corresponds to an interest category, identifying one or more posts that correspond to the interest category, ordering each of the one or more posts into a first group based on authority ratings of users who made the posts, and sending the first group of ordered one or more posts to the first user.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 3A-3E illustrate screenshots of an interface configured to manage feeds based on interest categories, according to embodiments of the invention.

DETAILED DESCRIPTION

In the following description, several specific details are presented to provide a thorough understanding of embodiments of the invention. One skilled in the relevant art will recognize, however, that the concepts and techniques disclosed herein can be practiced without one or more of the specific details, or in combination with other components, etc. In other instances, well-known implementations or operations are not shown or described in detail to avoid obscuring aspects of various examples disclosed herein.

Figure 1:
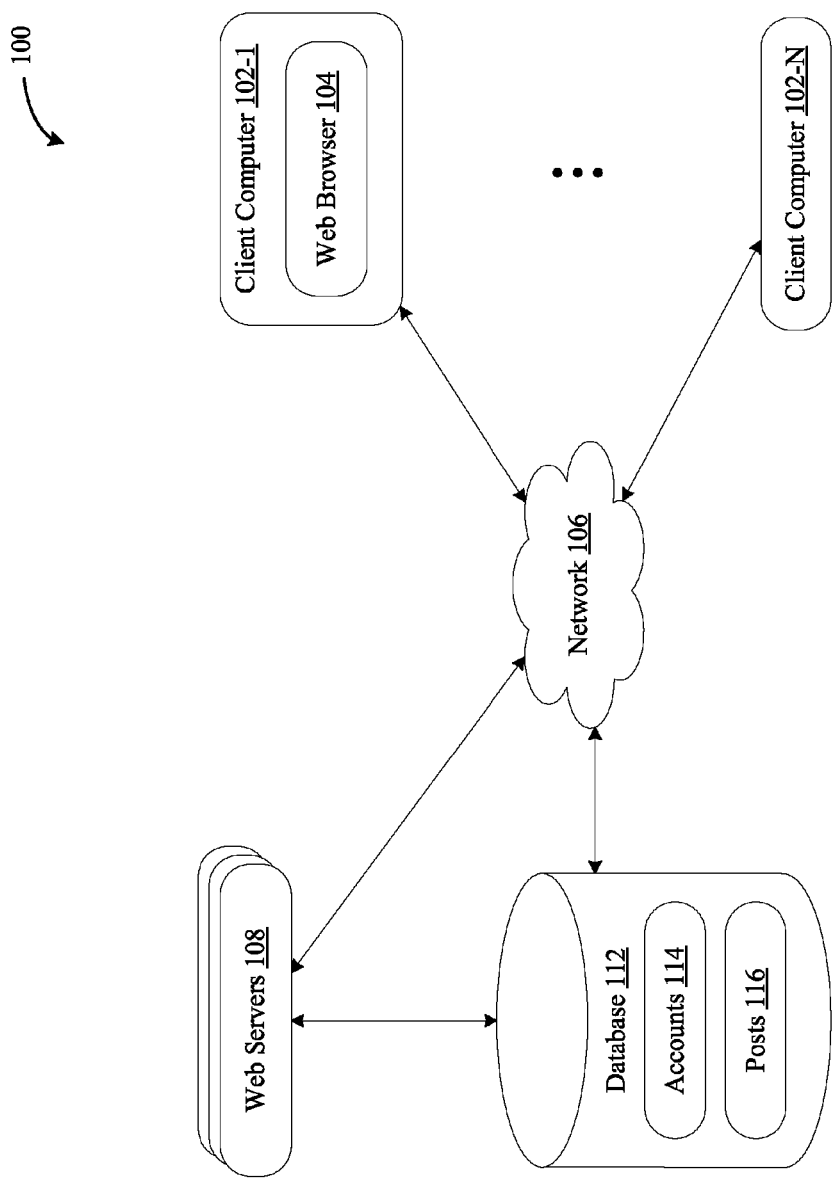
FIG. 1 illustrates a networked computer environment in which embodiments of the invention may be practiced.

FIG. 1 illustrates a networked computer environment 100 in which embodiments of the invention may be practiced. As shown, the networked computer environment 100 includes a plurality of client computers 102 (only two of which are shown) and a plurality of web servers 108 that are in communication with database 112, which stores accounts 114 and posts 116. In one embodiment, the database 112 is managed by a separate entity (e.g., a cloud storage provider) than the web server 108. In this embodiment, the data included in the posts 116 can be transferred from the client computer 102 to the database 112 via the network 106, bypassing the web servers 108. An account 114 is a data object that stores data associated with a user, such as the user's email address, password, contact information, billing information, upload preferences, and the like. An online post 116 is a data object for a post made by a user, which may include, for example, text, images, videos, and the like. The client computers 102 and the web server computers 108 are connected over a computer network 106, e.g., the Internet.

Figure 2:
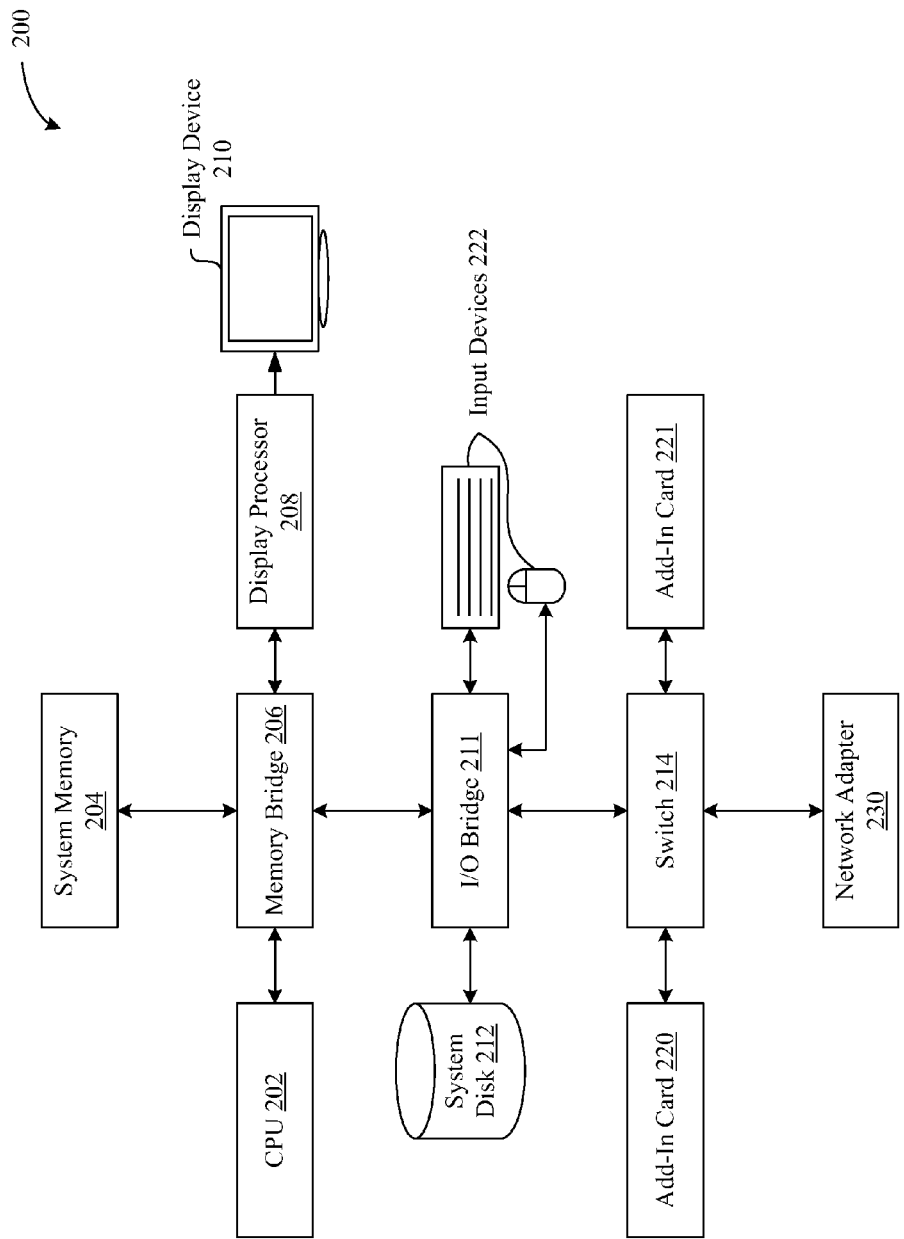
FIG. 2 depicts one architecture of a computer system within which embodiments of the present invention may be implemented.

Each client computer 102 includes conventional components of a computing device, e.g., a processor, system memory, a hard disk drive, input devices such as a mouse and a keyboard, and output devices such as a monitor, as illustrated in FIG. 2. Each web server 108 includes a processor and a system memory (not shown). Web servers 108 are programmed to communicate with one another and are also programmed to communicate with client computers 102 using the TCP/IP protocol. The client computers 102 are programmed to execute web browser programs and other software applications, such as web browser 104, and access the web pages and/or applications managed by web servers 108 by specifying in web browser 104 a uniform resource locator (URL) that directs to web servers 108.

In the embodiments of the present invention described below, users are respectively operating the client computers 102 that are connected to the web servers 108 over the network 106. The web pages that are displayed to a user are transmitted from the web servers 108 to the user's client computer 102 and processed by web browser 104 in that user's client computer 102 for display through a display device in communication with that user's client computer 102.

FIG. 2 depicts one architecture of a computer system 200 within which embodiments of the present invention may be implemented. Specifically, computer system 200 is representative of a configuration that may be implemented by web servers 108 and/or client computers 102. Computer system 200 may be a computer workstation, personal computer, video game console, personal digital assistant, rendering engine, or any other device suitable for practicing one or more embodiments of the present invention.

As shown, computer system 200 includes a central processing unit (CPU) 202 and a system memory 204 communicating via a bus path that may include a memory bridge 206. CPU 202 includes one or more processing cores, and, in operation, CPU 202 is the master processor of system 200, controlling and coordinating operations of other system components. System memory 204 stores software applications and data for use by CPU 202. CPU 202 runs software applications and optionally an operating system. Memory bridge 206, which may be, e.g., a Northbridge chip, is connected via a bus or other communication path (e.g., a HyperTransport link) to an I/O (input/output) bridge 211. I/O bridge 211, which may be, e.g., a Southbridge chip, receives user input from one or more user input devices 222 (e.g., keyboard, mouse, joystick, digitizer tablets, touch pads, touch screens, still or video cameras, motion sensors, and/or microphones) and forwards the input to CPU 202 via memory bridge 206.

A display processor 208 is coupled to memory bridge 206 via a bus or other communication path (e.g., a PCI Express, Accelerated Graphics Port, or HyperTransport link); in one embodiment display processor 208 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 204.

Display processor 208 periodically delivers pixels to a display device 210 (e.g., a screen or conventional CRT, plasma, OLED, SED or LCD based monitor or television). Additionally, display processor 208 may output pixels to film recorders adapted to reproduce computer generated images on photographic film. Display processor 208 can provide display device 210 with an analog or digital signal.

A system disk 212 is also connected to I/O bridge 211 and may be configured to store content and applications and data for use by CPU 202 and display processor 208. System disk 212 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 214 provides connections between I/O bridge 211 and other components such as a network adapter 230 and various add-in cards 220 and 221. Network adapter 230 allows system 200 to communicate with other systems via an electronic communications network, and may include wired or wireless communication over local area networks and wide area networks such as the Internet.

Other components (not shown), including USB or other port connections, film recording devices, and the like, may also be connected to I/O bridge 211. For example, an audio processor may be used to generate analog or digital audio output from instructions and/or data provided by CPU 202, system memory 204, or system disk 212. Communication paths interconnecting the various components in FIG. 10 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 208 incorporates circuitry optimized for graphics and video processing, including, for example, video output circuitry, and constitutes a graphics processing unit (GPU). In another embodiment, display processor 208 incorporates circuitry optimized for general purpose processing. In yet another embodiment, display processor 208 may be integrated with one or more other system elements, such as the memory bridge 206, CPU 202, and I/O bridge 211 to form a system on chip (SoC). In still further embodiments, display processor 208 is omitted and software executed by CPU 202 performs the functions of display processor 208.

Pixel data can be provided to display processor 208 directly from CPU 202. In some embodiments of the present invention, instructions and/or data representing a scene are provided to a render farm or a set of server computers, each similar to system 200, via network adapter 230 or system disk 212. The render farm generates one or more rendered images of the scene using the provided instructions and/or data. These rendered images may be stored on computer-readable media in a digital format and optionally returned to system 200 for display. Similarly, stereo image pairs processed by display processor 208 may be output to other systems for display, stored in system disk 212, or stored on computer-readable media in a digital format.

Alternatively, CPU 202 provides display processor 208 with data and/or instructions defining the desired output images, from which display processor 208 generates the pixel data of one or more output images, including characterizing and/or adjusting the offset between stereo image pairs. The data and/or instructions defining the desired output images can be stored in system memory 204 or graphics memory within display processor 208. In an embodiment, display processor 208 includes 3D rendering capabilities for generating pixel data for output images from instructions and data defining the geometry, lighting shading, texturing, motion, and/or camera parameters for a scene. Display processor 208 can further include one or more programmable execution units capable of executing shader programs, tone mapping programs, and the like.

It will be appreciated that the system shown herein is illustrative and that variations and modifications are possible. The connection topology, including the number and arrangement of bridges, may be modified as desired. For instance, in some embodiments, system memory 204 is connected to CPU 202 directly rather than through a bridge, and other devices communicate with system memory 204 via memory bridge 206 and CPU 202. In other alternative topologies display processor 208 is connected to I/O bridge 211 or directly to CPU 202, rather than to memory bridge 206. In still other embodiments, I/O bridge 211 and memory bridge 206 might be integrated into a single chip. The particular components shown herein are optional; for instance, any number of add-in cards or peripheral devices might be supported. In some embodiments, switch 214 is eliminated, and network adapter 230 and add-in cards 220, 221 connect directly to I/O bridge 211.

Network computers are another type of computer system that can be used in conjunction with the teachings provided herein. Network computers do not usually include a hard disk or other mass storage, and the executable programs are loaded from a network connection into the memory 204 for execution by the CPU 202. A Web TV system, which is known in the art, is also considered to be a computer system, but it may lack some of the features shown in FIG. 2, such as certain input or output devices. A typical computer system will usually include at least a processor, memory, and a bus coupling the memory to the processor. In some embodiments, the system 200 may include one or more CPUs 202, one or more display processors 208, and/or one or more of any of the system elements included in FIG. 2.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present example also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, flash memory, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description above. In addition, the present examples are not described with reference to any particular programming language, and various examples may thus be implemented using a variety of programming languages.

FIGS. 3A-3E illustrate screenshots of an interface configured to manage feeds based on interest categories, according to embodiments of the invention. As shown, feed interface 300 displays to a viewer a feed for a user named "John Doe". Here, the viewer is not subscribed to any posts made by John Doe, and therefore interface buttons are displayed, which enable the viewer to subscribe to all of John's interests 302, subscribe to intersecting interests 304, or subscribe to specific interests 306, respectively, as described in further detail below.

Each user, when creating a post, tags the post with one or more interest categories that pertain to the post. In some cases, however, an interest category is accidentally or inaccurately tagged to a post, thereby resulting in the viewer receiving a post that is irrelevant to his or her interests. Thus, as described below, embodiments of the invention provide a technique for detecting and removing erroneous interest categories from posts.

Figure 3A:
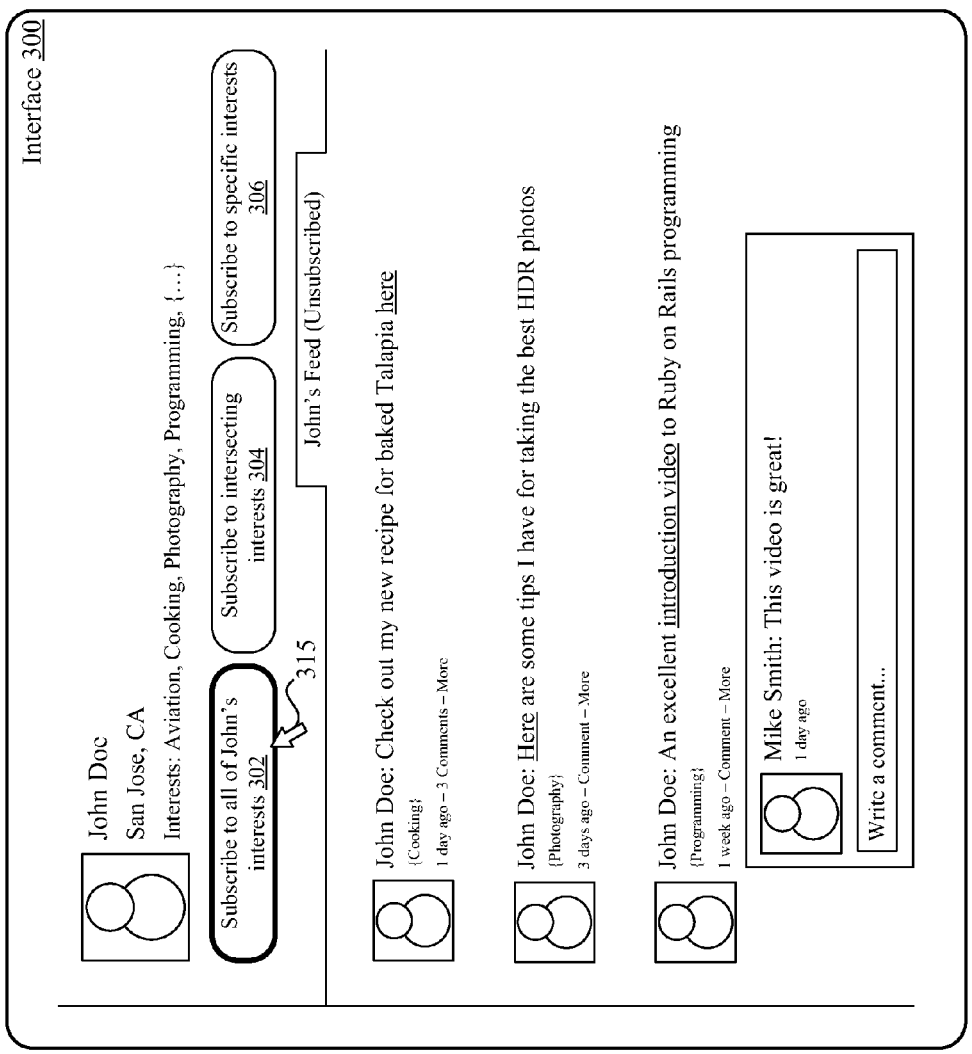

If the viewer chooses to subscribe to all of John Doe's interests by selecting interface button 302 using, for example, a mouse cursor 315, then the viewer receives an update each time John Doe makes a post, regardless of the interest category associated with the post. For example, three posts are illustrated in FIG. 3A, where the first post is associated with a "Cooking" interest category, a second post associated with a "Photography" interest category, and a third post associated with a "Programming" interest category. The viewer is also able to view comments made to posts that he or she receives, such as the comment Mike Smith makes to John Doe's third post in FIG. 3A.

Figure 3B:
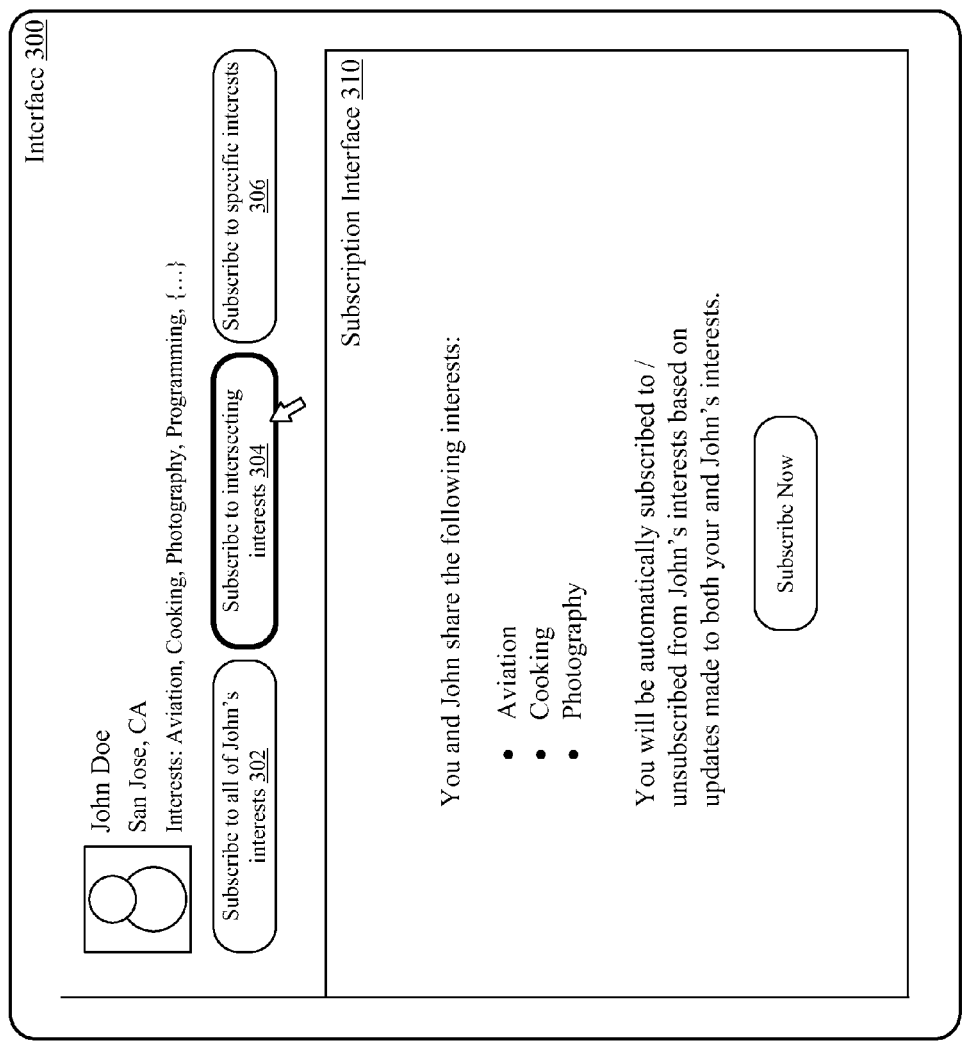
Figure 3C:
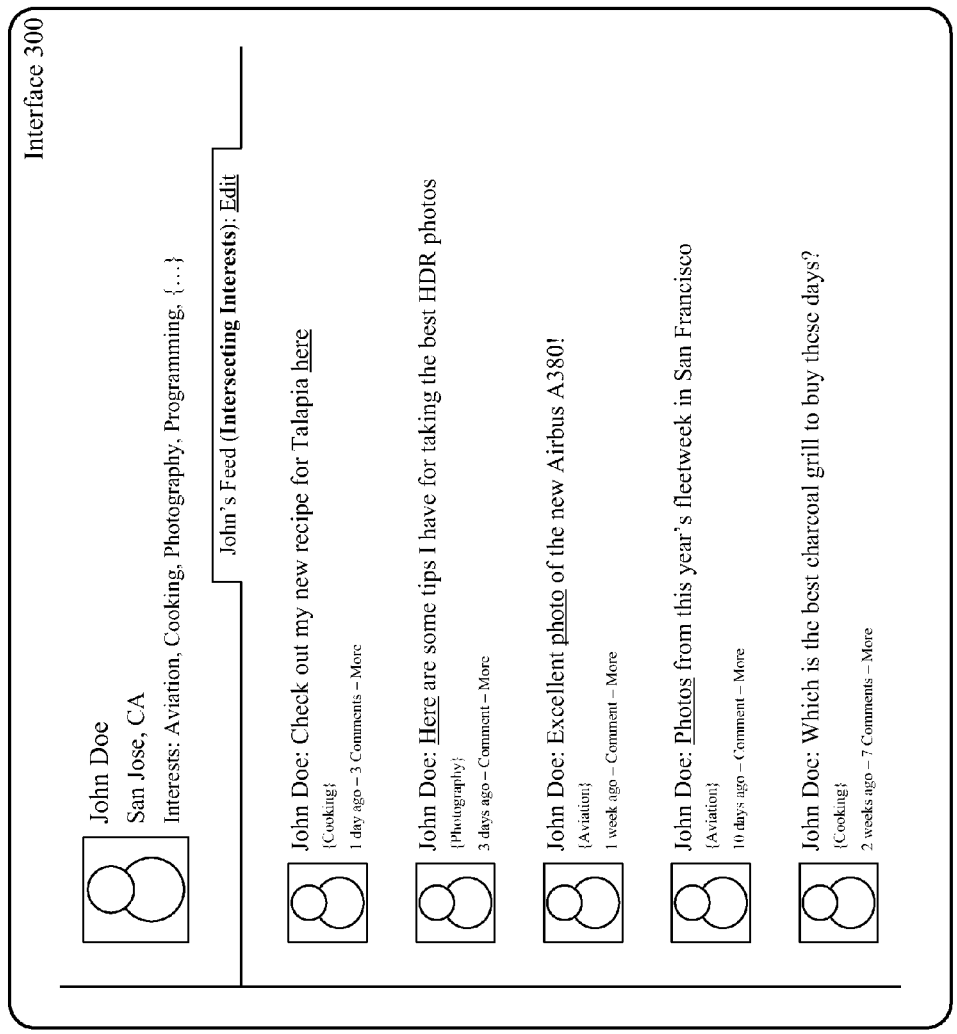

FIG. 3B illustrates the viewer subscribing to intersecting interests by selecting interface button 304, which causes web server 108 to display to the viewer subscription interface 310. Prior to displaying subscription interface 310, web server 108 analyzes interest categories that are associated with the viewer. Such interest categories may be identified by parsing interest categories explicitly identified by the viewer, such as interest categories listed on the viewer's profile page. Such interest categories may also be identified by analyzing the habits of the viewer, such as determining which interest category feeds the viewer spends the most time viewing. Web server 108 intersects the interest information associated with the viewer with the interest information associated with John Doe. In the example illustrated in FIG. 3B, web server 108 determines that the interest categories Aviation, Cooking, and Photography intersect between the viewer and John Doe, and enables the viewer to subscribe to John Doe's posts that are tagged with these interest categories. Subsequently, when web server 108 receives a request from the viewer to view John Doe's profile page, web server 108 sends to the viewer only posts by John Doe that are tagged with the interest categories Aviation, Cooking, and/or Photography, as illustrated in FIG. 3C. As shown in FIG. 3C, the viewer may update the nature of his or her subscription to John Doe's feed (i.e., subscribe to all or select interest categories) by selecting the "Edit" hyperlink listed in the user interface tab for John's Feed. Other posts made by John Doe that are tagged with other categories besides Aviation, Cooking, or Photography (e.g., tagged with the category "Programming") would not appear in the interface 300 since the viewer does not share those interests with John Doe.

Additionally, the viewer may opt for web server 108 to automatically update the intersection of interests when changes are made to either the viewer's interest categories or John Doe's interest categories. In this way, if the viewer becomes disinterested in, for example, the Aviation interest category, then the viewer need not manually unsubscribe to receiving posts from John Doe that are tagged with the Aviation interest category. Instead, the viewer may simply remove Aviation from his or her interest categories, whereupon web server 108 updates the intersection of interest categories between the viewer and John Doe. Of course, web server 108 may be configured to update the intersections of interest categories of all additional users from which the viewer is subscribed to receive updates.

FIG. 3D illustrates the viewer subscribing to specific interests by selecting interface button 306, which causes web server 108 to display viewer subscription interface 312. Prior to displaying subscription interface 312, web server 108 retrieves the interest categories that are associated with John Doe. Such interest categories may be identified by parsing interest categories explicitly identified by John Doe, such as interest categories listed on his profile page. Such interest categories may also be identified by analyzing the posting habits of the John Doe. For example, John Doe might regularly create posts that are tagged with an interest category that is not explicitly listed on his or her profile page, but are nonetheless interest categories that he regularly tags to his posts. Thus, as described below in conjunction with FIGS. 4A-4C, embodiments of the invention provide a technique that suggests, based on a user's tagging habits, interest categories to which he or she should explicitly list on his or her profile page.

Figure 3E:
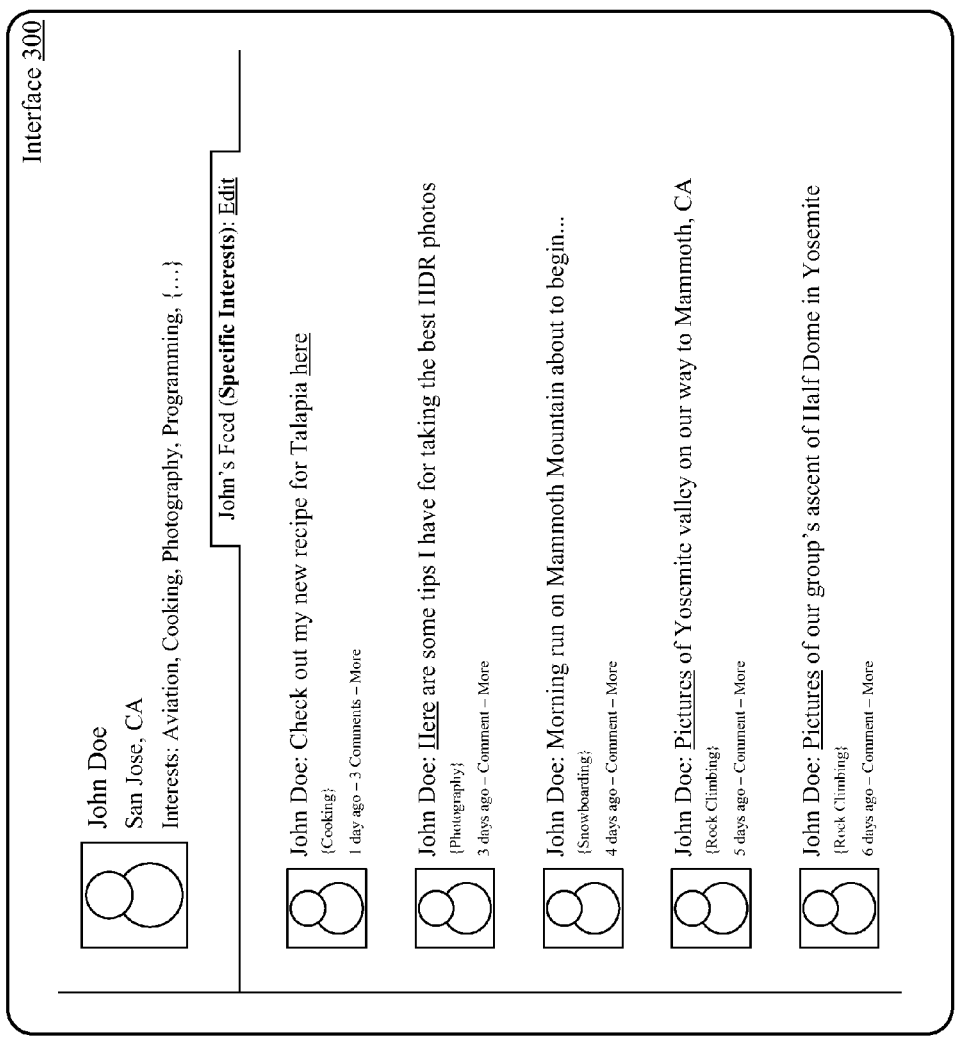

As shown in FIG. 3D, the viewer may subscribe to interest categories Aviation, Cooking, Photography, Programming, Rock Climbing, Skiing and Snowboarding, all of which are interest categories associated with John Doe. As shown, the viewer subscribes only to the interest categories Aviation, Cooking, Photography, Rock Climbing and Snowboarding. Subsequently, when web server 108 receives a request from the viewer to view John Doe's profile page, web server 108 sends to the viewer only posts by John Doe that are tagged with the interest categories that he or she selected in subscription interface 312, as illustrated in FIG. 3E.

Figure 4A:
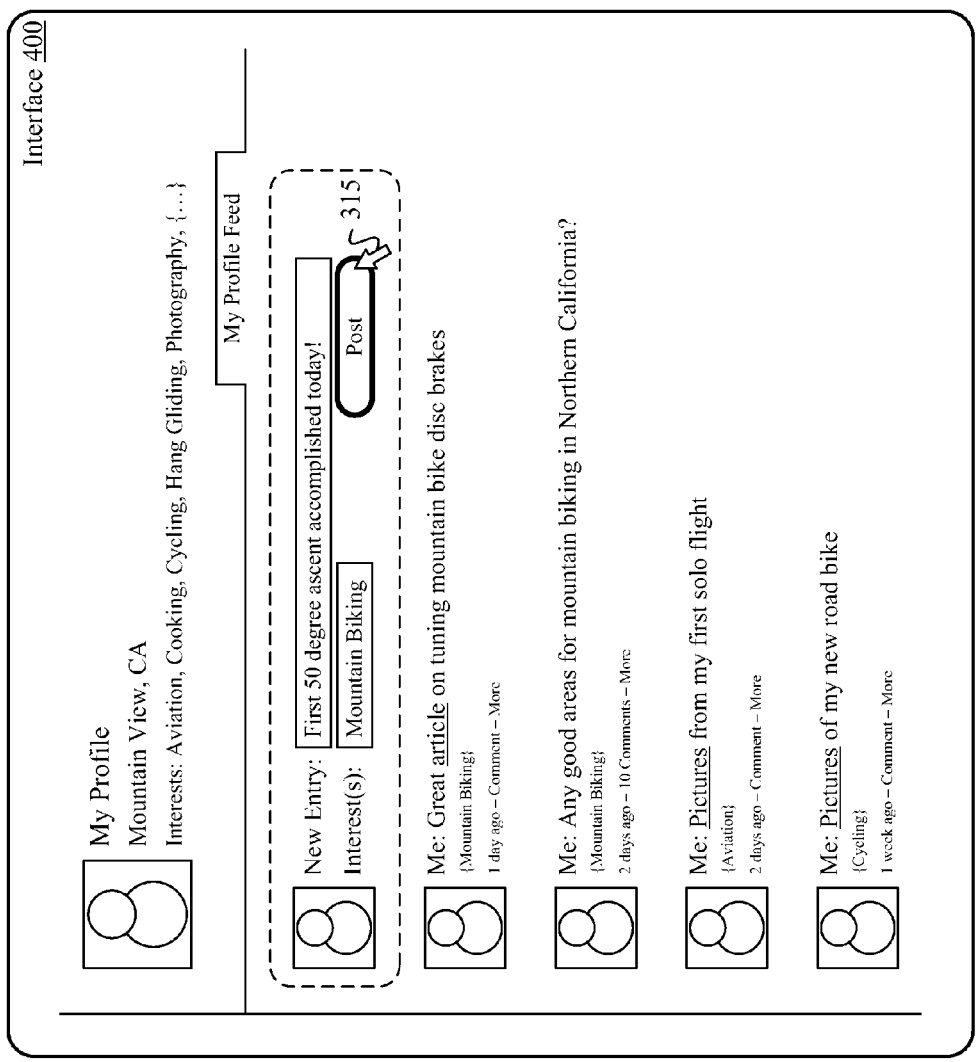
FIGS. 4A-4C illustrate screenshots of an interface configured to automatically add interest categories based on posting habits, according to embodiments of the invention.
Figure 4B:
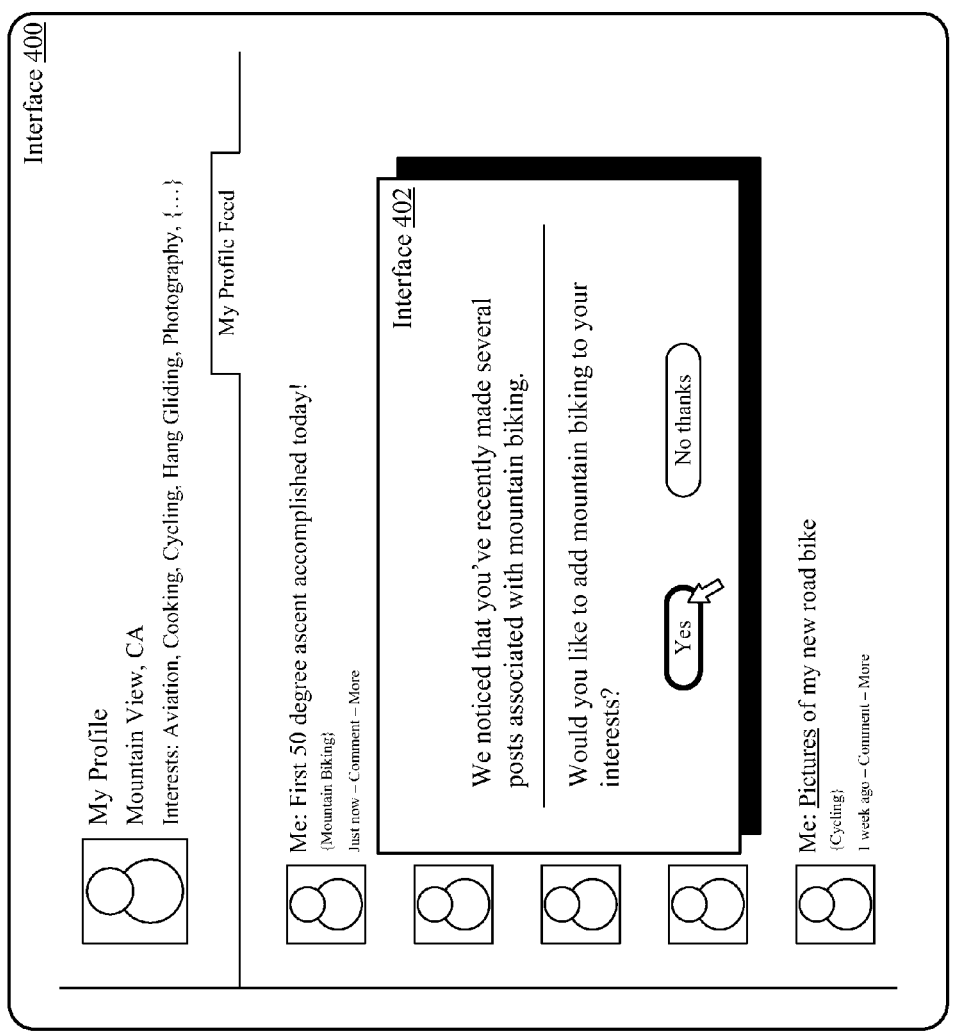
Figure 4C:
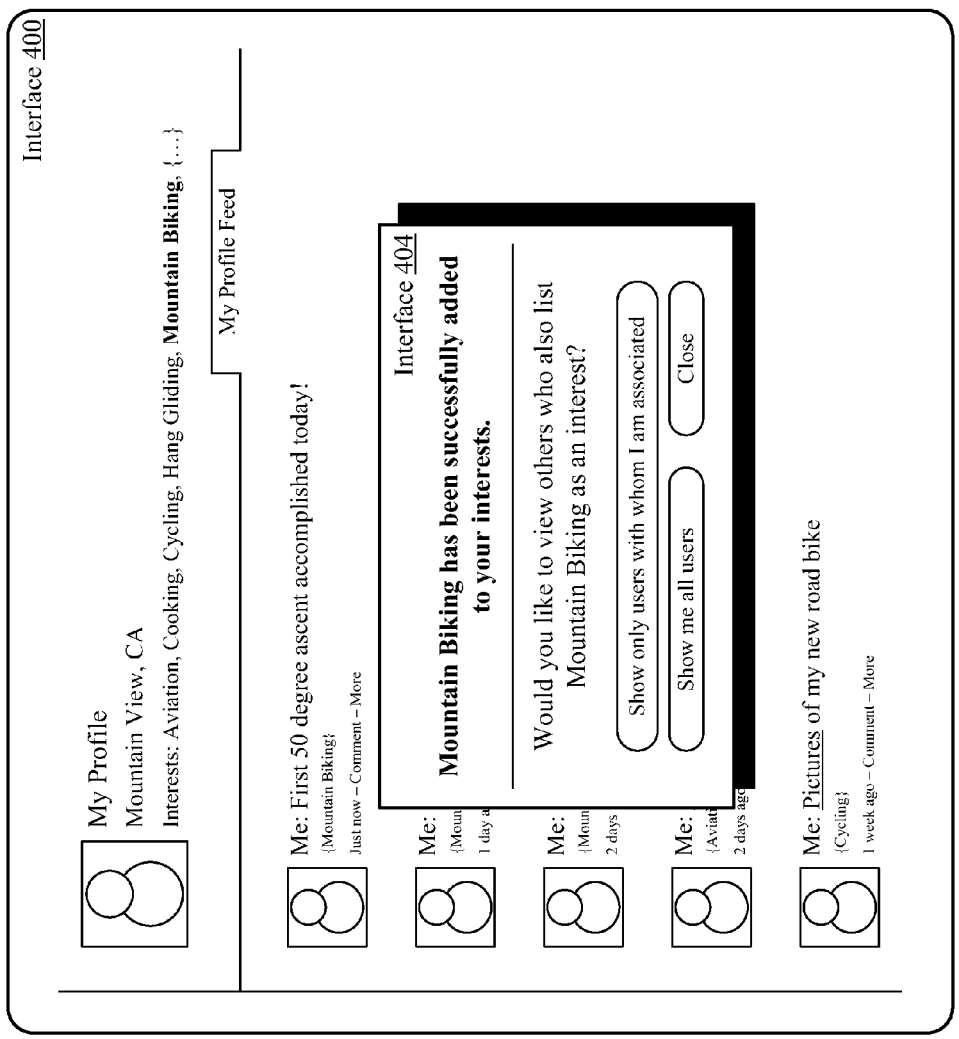

FIGS. 4A-4C illustrate screenshots of an interface 400 configured to automatically add interest categories based on posting habits, according to one embodiment of the invention. FIG. 4A depicts a user creating a new post and tagging the post with the interest category "Mountain Biking." As shown in interface 400, the user is associated with at least the interest categories Aviation, Cooking, Cycling, Hang Gliding and Photography, but not Mountain Biking. As also shown in interface 400, the user has already submitted several posts that are tagged with the interest category Mountain Biking.

In some embodiments, web server 108 is configured to analyze each new post to determine whether interest categories tagged to the post are associated with the user making the post. If web server 108 determines that an interest category tagged to a post is not associated with the user making the post, then web server 108 may further analyze recent posts made by the user to determine a level of interaction that the user has with the interest category. For example, as described above, the user, despite not explicitly listing Mountain Biking as an interest category, has already made several posts tagged with that interest category.

Accordingly, when the user submits the new post illustrated in FIG. 4A, web server 108 determines that the interest category Mountain Biking should be recommended to the user, and displays a recommendation interface 402 to the user, which is illustrated in FIG. 4B. The user may then, via recommendation interface 402, add the interest category Mountain Biking to his or her interests, which causes web server 108 to subsequently update the interests listed on the users profile page, as illustrated by the bolded text in FIG. 4C. Alternatively, web server 108 may automatically add the interest category Mountain Biking to the user's interests based on preference settings associated with the user.

Figure 6A:
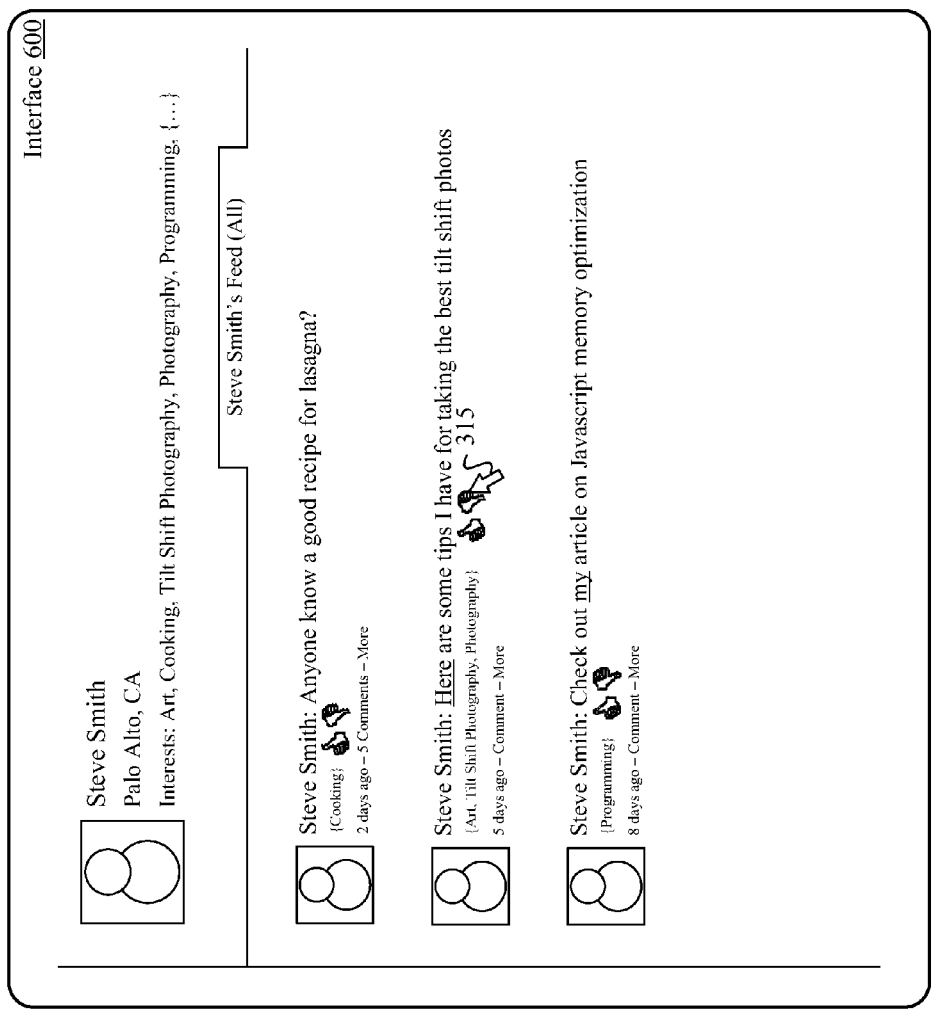
FIGS. 6A-6D illustrate screenshots of an interface configured to order posts in feeds based on user ratings, according to embodiments of the invention.

Also shown in FIG. 4C is interface 404, which web server 108 displays to the user after associating interest category Mountain Biking with the user. As shown, interface 404 enables the user to explore the new interest category Mountain Biking by, for example, viewing other user's who list Mountain Biking as an interest category and are users with whom the user is associated. Alternatively, the user may opt to view all users who are associated with the interest category Mountain Biking, which may enable him or her to view posts made by users who are more authoritative on the topic of Mountain Biking than his or her friends, as described in further detail below in conjunction with FIGS. 6A-7.

Figure 5:
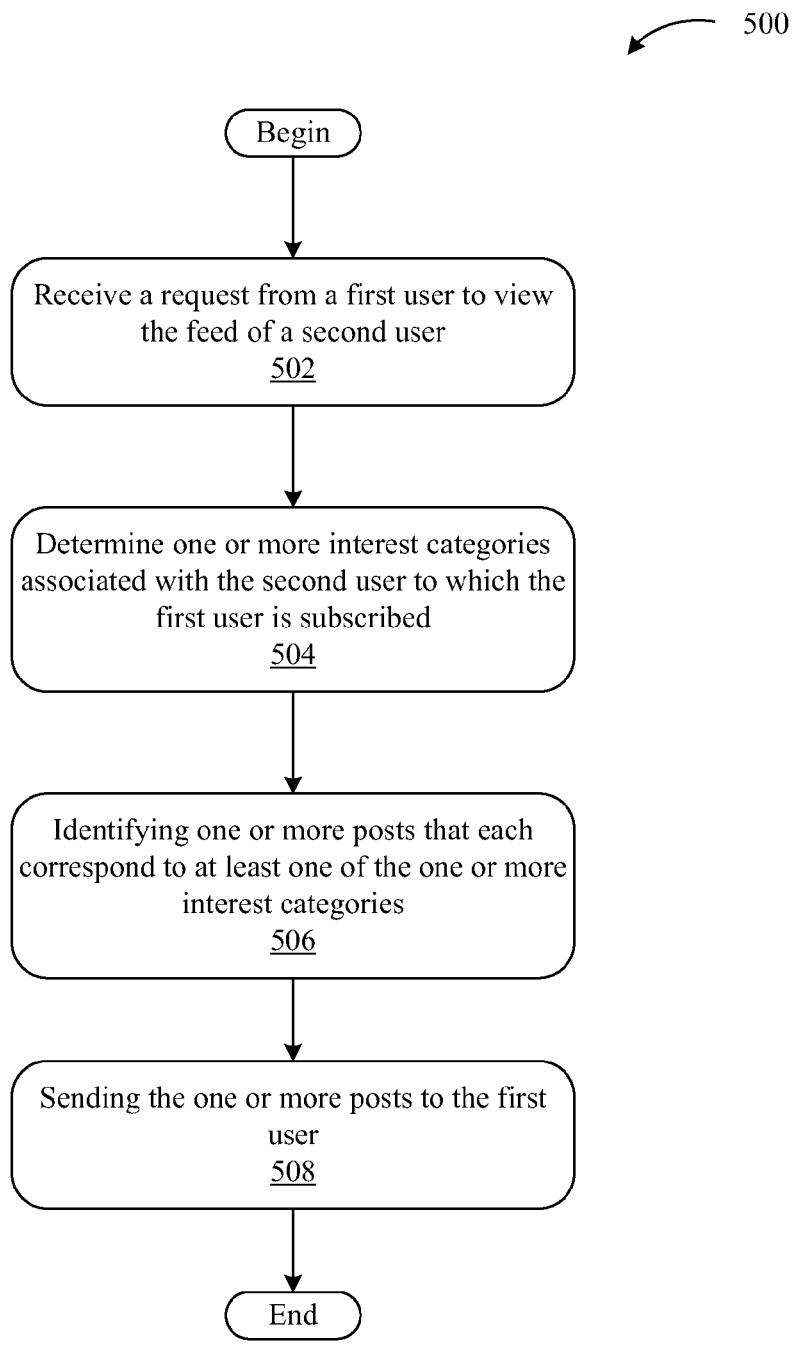
FIG. 5 is a flow diagram of method steps for filtering posts in a feed based on interest categories associated with the posts, according to one embodiment of the invention.

FIG. 5 is a flow diagram of method steps 500 for filtering posts in a feed based on interest categories associated with the posts, according to one embodiment of the invention. As shown, method 500 begins at step 502, where web server 108 receives a request from a first user to view the feed of a second user. At step 504, web server 108 determines one or more interests associated with the second user to which the first user is subscribed, as described above in conjunction with FIGS. 3A-4C. At step 506, web server 108 identifies one or more posts that each correspond to at least one of the one or more interest categories. At step 508, web server 108 sends the one or more posts to the first user.

FIGS. 6A-6D illustrate screenshots of an interface 600 configured to order posts in feeds based on user ratings, according to one embodiment of the invention. As shown, interface 600 displays to a viewer the profile page of a user named "Steve Smith," where the viewer is subscribed to receive all posts made by Steve Smith, i.e., posts that are tagged with any interest category. The second post included in interface 600 is tagged with the interest categories Art, Tilt Shift Photography, and Photography. Also displayed near each post are thumbs-up and thumbs-down icons that enable the viewer to indicate whether the interest category or interest categories tagged to a post are relevant to the post.

Figure 6B:
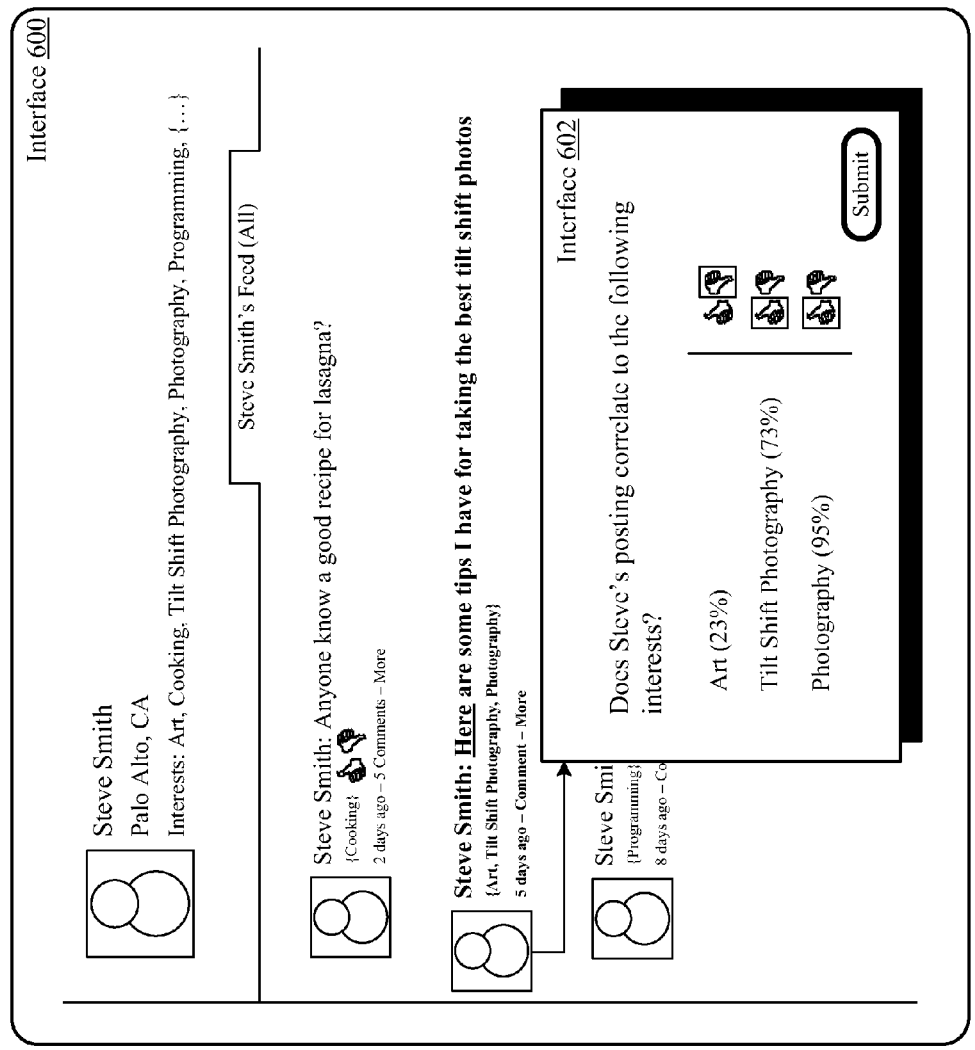

For example, when the viewer selects either the thumbs-up icon or the thumbs-down icon within a post that is tagged with two or more interest categories, web server 108 displays to the viewer post rating interface 602. As shown in FIG. 6B, post rating interface 602 displays each of the interest categories that are associated with the post: Art, Tilt Shift Photography, and Photography, where each interest category has associated therewith a thumbs-up and a thumbs-down icon. Each of the interest categories is also accompanied by a percentage value that indicates the percentage of viewers who have selected the thumbs-up icon for the interest category on the selected post. For example, the percentage value 23% would indicate that 77% viewers selected the thumbs-down icon for the selected post while 23% viewers selected the thumbs-up icon for the selected post.

Figure 6C:
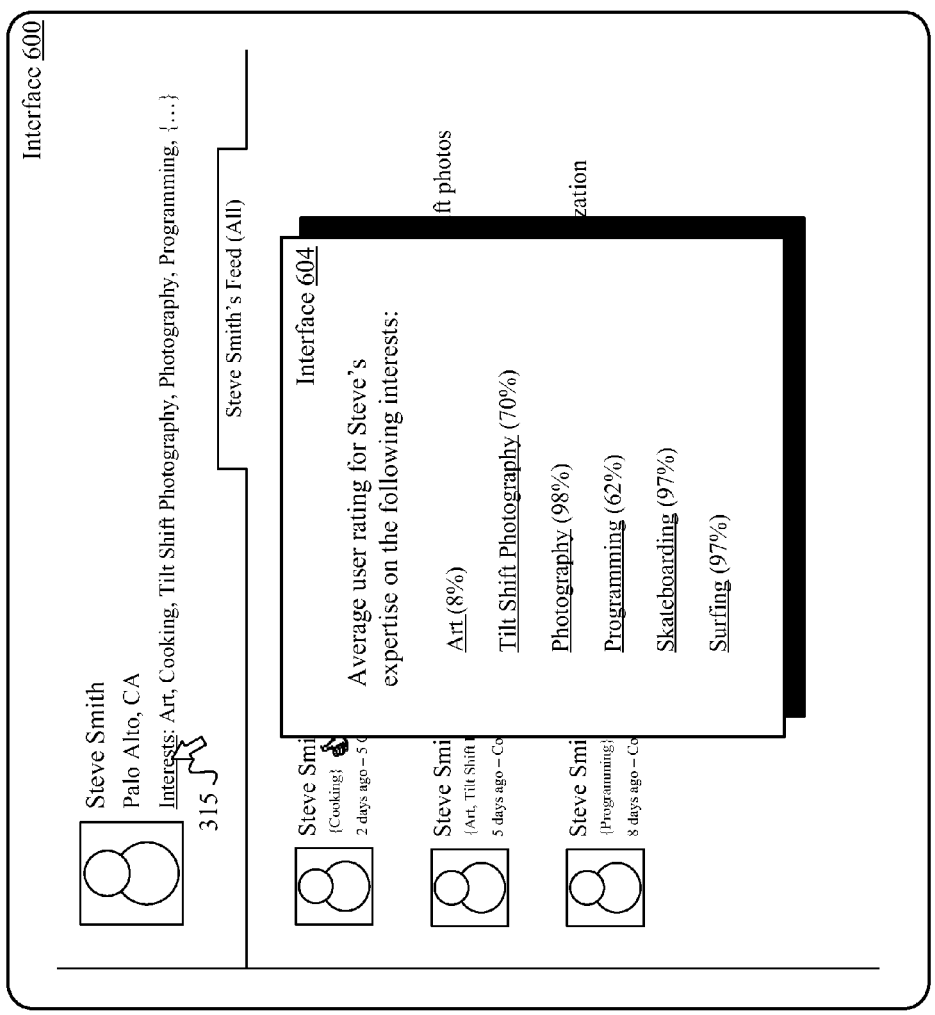

Accordingly, the viewer can select the thumbs-up or thumbs-down icon for one or more of the interest categories displayed in interface 602 (indicated by the boxes drawn around the thumbs-up icons and/or thumbs-down icons) and then select the submit button. In response, web server 108 displays to the viewer an interest category rating overview interface 604, which is illustrated in FIG. 6C. As shown, interest category rating overview interface 604 lists each of the interest categories with which Steve Smith is associated, and also displays a percentage value for each interest category that indicates the percentage of viewers who have selected the thumbs-up icon on posts tagged with the interest category. In some embodiments, web server 108 may be configured to add weight to a particular viewer's selection of the thumbs-up icon or the thumbs-down icon when the viewer has, for the same interest category, an overall percentage value that exceeds a particular threshold. In other words, an expert user in a particular interest category has a greater weight when giving a thumbs-up to other users' posts in the interest category relative to other users' thumbs-up. For example, Steve Smith may be an expert in Skateboarding, as indicated by his 97% thumbs-up rate for that interest category. If Steve Smith selects a thumbs-up icon for another user's post that is tagged only with the interest category "Skateboarding," then web server 108 may triple the value of Steve Smith's vote, thereby increasing the rate at which the posting user's authority level increases. Of course, the thumbs-down icon may work in a similar, but opposite, way. Moreover, web server 108 may be configured to notify a user when an interest category tagged to one of his or her posts receives a low rating, which might indicate that the user erroneously tagged the post.

Figure 6D:
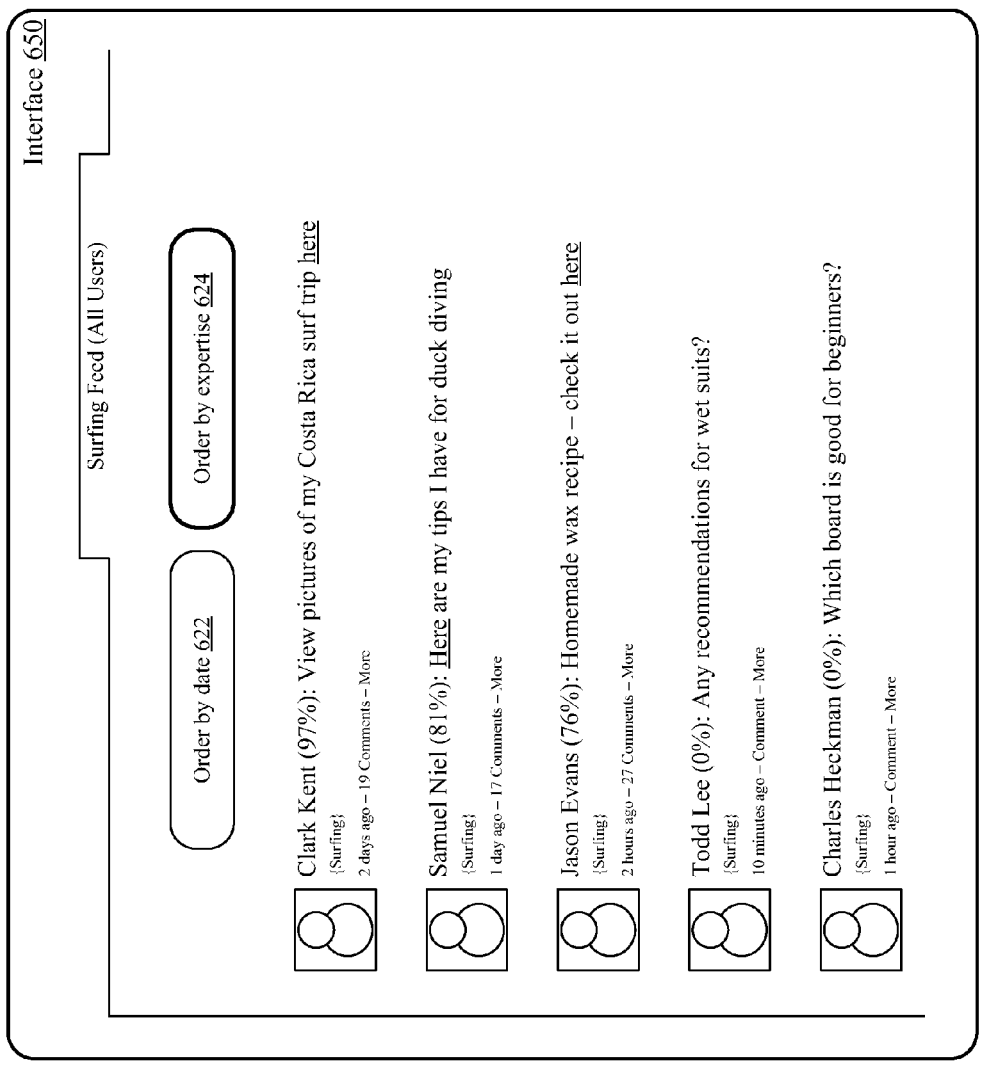

The overall percentage values may also be used to order posts in a feed based on the authority of the users that create the posts. For example, FIG. 6D illustrates interface 650, which includes a view of all posts that are tagged with the interest category "Surfing". As shown, interface 650 includes interface button 622 and interface button 624, which enables a viewer to order the posts by their date or by the authority of the users, respectively. As shown, the viewer selects interface button 624, which causes web server 108 to order the posts based on the authority of the users. For example, a post by a user named "Clark Kent," who has the highest overall percentage value for the interest category Surfing amongst all users, is listed top-most relative to the other posts, even though it was not the most recent post tagged with the interest category Surfing.

Figure 7:
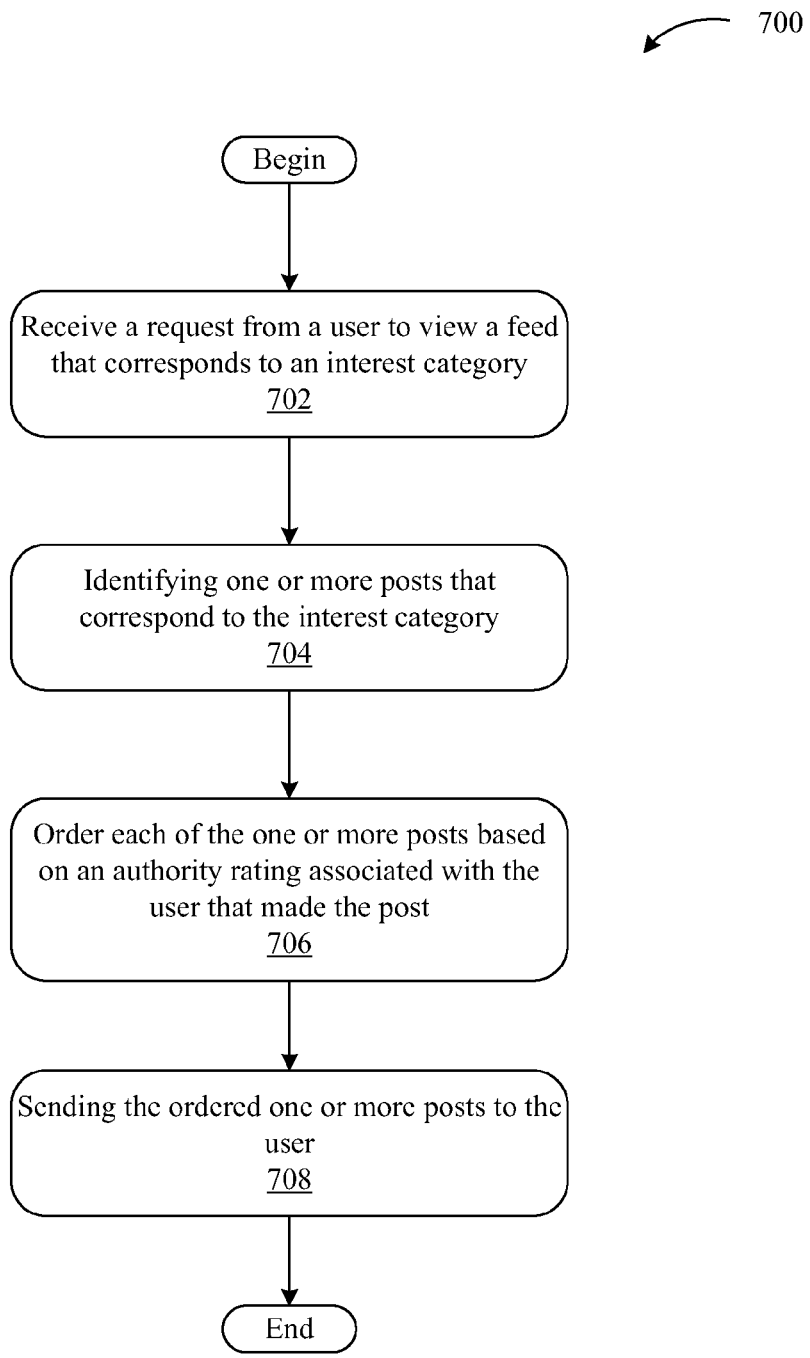
FIG. 7 is a flow diagram of method steps for ordering posts in a feed based on authority ratings associated with users who make the posts, according to one embodiment of the invention.

FIG. 7 is a flow diagram of method steps 700 for ordering posts in a feed based on authority ratings associated with users that make the posts, according to one embodiment of the invention. As shown, method 700 begins at step 702, where web server 108 receives a request from a user to view a feed that corresponds to an interest category. At step 704, web server 108 identifies one or more posts that correspond to the interest category. At step 706, web server 108 orders each of the one or more posts based on an authority rating associated with the user that made the post, as described above in conjunction with FIGS. 6A-6D. At step 708, web server 108 sends the ordered one or more posts to the user.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

It will be appreciated to those skilled in the art that the preceding examples are exemplary and not limiting. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed is:

1. A method for filtering posts in a feed of a social network based on interest categories associated with the posts, the method comprising:
   receiving from a first user a request to view the feed, wherein the feed is associated with a second user;
   determining one or more interest categories associated with the second user;
   determining an authority level of the second user related to the one or more interest categories, wherein the authority level determination comprises:
      receiving a rating from a third user;
      determining an expertise threshold for the third user; and
      applying a multiplier to the third user rating in response to the expertise threshold, wherein the authority level of the second user is increased or decreased with regard to the one or more interest categories in response to the third user rating;
   identifying at least one post that corresponds to at least one of the one or more interest categories;
   displaying to the first user the option to subscribe to one or more interest categories of the second user by selecting to subscribe to all of the interest categories associated with the second user, by selecting to subscribe to each intersecting interest category that is associated with both the first user and the second user, or by selecting to subscribe to specific interest categories associated with the second user; and
   sending to the first user the one or more posts associated with the interest categories of the second user to which the first user is now subscribed based upon the authority rating of the second user.

2. The method of claim 1, further comprising:
   receiving from the second user a request to insert a post into the feed, wherein the post is associated with a new interest category that is not already associated with the second user; and
   automatically associating the new interest category with the second user.

3. The method of claim 2, further comprising:
   displaying to the second user an option to view feeds of all other users of the social network who are associated with the new interest category.

4. The method of claim 2, further comprising:
   displaying to the second user an option to view feeds of other users of the social network who are both associated with the new interest category and are associated with the second user.

5. The method of claim 1, further comprising:
   receiving from the first user a request to remove one or more interest categories associated with a feed of the first user; and
   automatically updating the intersecting interests of all additional users to which the first user is subscribed.

6. A non-transitory computer readable storage medium storing instructions that, when executed by a processor, cause the processor to filter posts in a feed of a social network based on interest categories associated with the posts, by performing the steps of:

receiving from a first user a request to view the feed, wherein the feed is associated with a second user;

determining one or more interest categories associated with the second user;

determining an authority level of the second user related to the one or more interest categories, wherein the authority level determination comprises:

receiving a rating from a third user;

determining an expertise threshold for the third user; and applying a multiplier to the third user rating in response to the expertise threshold, wherein the authority level of the second user is increased or decreased with regard to the one or more interest categories in response to the third user rating;

identifying at least one post that corresponds to at least one of the one or more interest categories;

displaying to the first user the option to subscribe to one or more interest categories of the second user by selecting to subscribe to all of the interest categories associated with the second user, by selecting to subscribe to each intersecting interest category that is associated with both the first user and the second user, or by selecting to subscribe to specific interest categories associated with the second user; and sending to the first user the one or more posts associated with the interest categories of the second user to which the first user is now subscribed based upon the authority rating of the second user.

7. The non-transitory computer readable storage medium of claim 6, wherein the steps further comprise:

receiving from the second user a request to insert a post into the feed, wherein the post is associated with a new interest category that is not already associated with the second user; and automatically associating the new interest category with the second user.

8. The non-transitory computer readable storage medium of claim 7, wherein the steps further comprise:

displaying to the second user an option to view feeds of all other users of the social network who are associated with the new interest category.

9. The non-transitory computer readable storage medium of claim 8, wherein the steps further comprise:

displaying to the second user an option to view feeds of other users of the social network who are both associated with the new interest category and are associated with the second user.

10. The method of claim 6, further comprising:

receiving from the first user a request to remove one or more interest categories associated with a feed of the first user; and automatically updating the intersecting interests of all additional users to which the first user is subscribed.

\* \* \* \* \*